H. G. MOORE
VEHICLE UNDERSTRUCTURE AND BODY CONSTRUCTION.
APPLICATION FILED DEC. 18, 1918.
1,359,906. Patented Nov. 23, 1920.
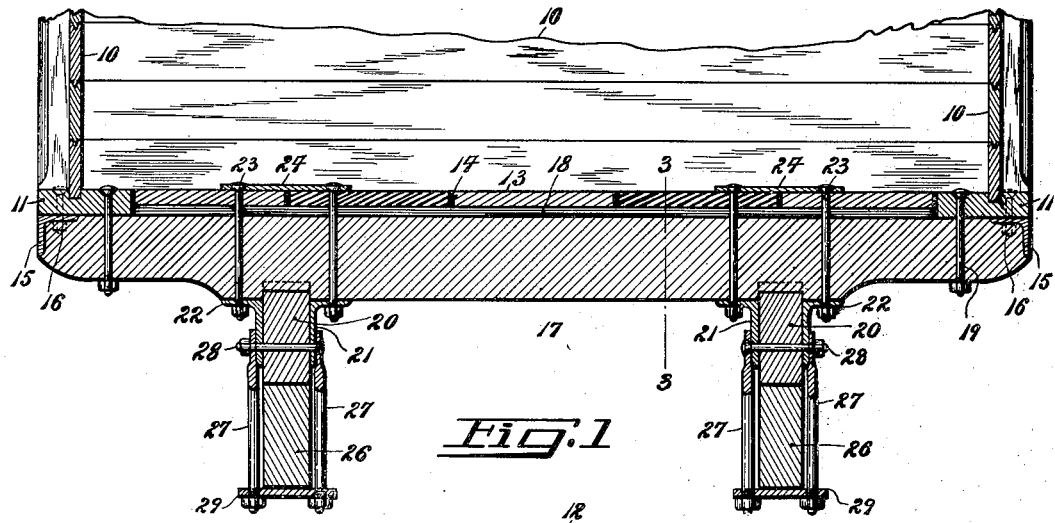
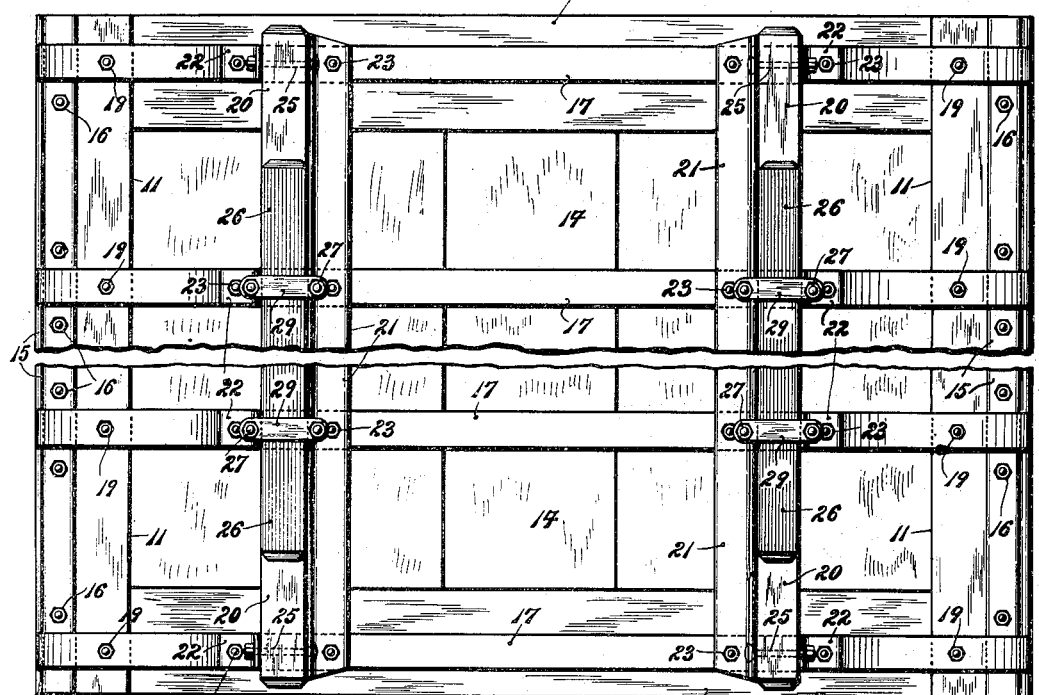
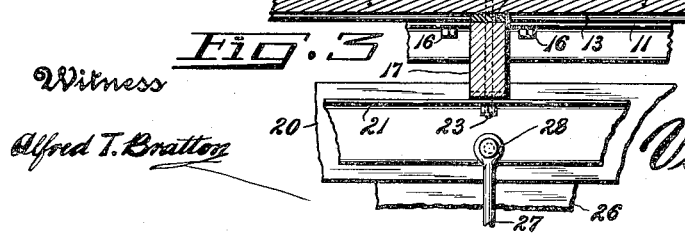
Inventor
Harry G. Moore

UNITED STATES PATENT OFFICE.

HARRY G. MOORE, OF PHILADELPHIA, PENNSYLVANIA.

VEHICLE UNDERSTRUCTURE AND BODY CONSTRUCTION.

1,359,906.                    Specification of Letters Patent.    Patented Nov. 23, 1920.

Application filed December 18, 1918. Serial No. 267,288.

*To all whom it may concern:*

Be it known that I, HARRY G. MOORE, a citizen of the United States, residing at Philadelphia, in the county of Philadelphia and State of Pennsylvania, have invented new and useful Improvements in Vehicle Understructure and Body Construction, of which the following is a specification.

This invention relates to the understructure and body construction of vehicles and it has more particular reference to the manner of building the understructures and bodies of motor trucks and especially to that type or form which is closed or more generally termed a van.

According to the prevalent methods of building the understructures and bodies of motor propelled vans, when a bottom or side sill or bolster breaks the entire body rapidly becomes distorted and gets twisted out of shape, and not infrequently is rendered entirely unfit for further use. This is particularly true in vehicles having superstructures or bodies of the inclosed type, such as moving vans and the like, and in which instances, when a part or parts of the understructure becomes loose or wear out, the rigidity of the superstructure is soon destroyed and the accompanying stresses and strains cause the sides and ends and top to be drawn, pulled or strained into an irregular shape entirely out of conformity with the original rigid building, thus soon bringing about the destruction of the materials employed and the mutilation of the entire design.

The main object of my present invention is to provide an understructure and bottom construction for vehicle bodies which is so built as to preclude any possibility of material injury to the body as a whole in the event of one or more of the sills or bolsters being damaged or breaking.

Another object of my invention is the provision of a vehicle understructure and body construction which is exceedingly strong and is calculated to resist all the excessive torsional strains to which heavy motor vans and trucks are constantly subjected. To this end, the parts forming the understructure are so related and combined by strengthening, bracing and securing means, including the rabbeting of certain elements to each other, that the result will be an understructure having absolute rigidity by the coöperation of the parts forming its make-up and by the structural relation of the understructure to the superstructure and the chassis that distortion is reduced to a minimum and in fact absolutely prevented even though the vehicle be subjected to heavy burdens and rough usage.

With these and other objects in view, my invention consists in the peculiar construction, novel and useful combinations and arrangements of parts, hereinafter fully described and particularly pointed out by the appended claims.

In describing my invention in detail, reference will be had to the accompanying sheet of explanatory drawings forming a part of this specification, wherein like characters of reference denote like or corresponding parts throughout the several views and in which:—

Figure 1— is a transverse vertical section through the lower part of a van or truck body embodying my improvements, and only such parts being shown as are essential to a clear conception thereof.

Fig. 2— is a fragmentary underside plan of the same; and,

Fig. 3— is a fragmentary section taken on the line 3—3 in Fig. 1.

As illustrated in the drawings, the numeral 10, designates the body or side and end walls of a van or truck body, which are rabbeted into side sills 11, and end sills 12, respectively as will be clearly understood on a close inspection of Fig. 1. Between the side sills 11 there is provided a floor 13, consisting of suitable boards 14 which are arranged to extend longitudinally of the body. Longitudinally of the under and outer edges of the side sills 11, are angle bars 15, extending the full length thereof and preferably secured in place by bolts 16, and it is to be noted that the transverse bolsters 17, are butted at their ends to fit snugly against and into said angle bars 15. Filler strips 18, are provided between the floor boards 14 and the transverse bolsters 17, and it is to be particularly noted that the bolts 16, which secure the angle bars 15 in place do not pass through the bolsters 17, but are disposed adjacent thereto, or spaced to each side thereof, while bolts 19, are employed for securing the side sills 11, to said bolsters, 17.

Longitudinally of the vehicle body and rabbeted into the bolsters 17 are parallel spaced runners 20, and abutting their inner faces are opposed angle bars 21, extending the full length thereof, whereas on the outer faces of said runners and abutting the underside of the bolsters 17, are opposed angle plates 22, said angle bars 21 and angle plates 22, being securely and rigidly held in place by bolts 23, which pass through the horizontal flanges thereof and through longitudinal metal floor strips 24, and the bolsters 17. Horizontal bolts 25,—Fig. 2—clamp the runners firmly between the depending flanges of the angle bars 21, and angle plates 22.

In order to firmly secure the entire understructure to the chassis frame or beams 26, I preferably employ the means illustrated, which consists of eye-bolts 27, bolted to the runners 20, by bolts 28, and which are adapted at their free ends to clamp locking plates 29, beneath the said chassis beams 26.

With this construction it will be seen that absolute rigidity is provided, particularly in view of the provision of the strips 24, the bolts 23 and the angle plates and bars 21, 22, to which the bolts 23 are connected, with the cross bolts 28 passing through the runner and the angular bars 21, 22, also secured to pass through the eye-bolts 27, which carry the clamping plates 29. All of these parts just mentioned are so designed and arranged, relative to each other, that they provide an absolutely rigid construction above and around the runners and chassis beams and secure absolute rigidity between the bolster and the runners.

From the foregoing it will be readily appreciated that a vehicle understructure and body construction built in accordance with my improvements is extremely rigid and effectively braced in every direction, all wood screws are eliminated in the laying of the floor, while the particular arrangement and disposition of the angle bars and angle plates prevents any tendency to distortion due to the accidental breakage of a bolster. Furthermore it will also be readily appreciated that with my improvements the body proper is safeguarded against the excessive shocks, strains and blows inherent to heavy motor vehicle constructions.

Having described my invention, I claim:

1. In a vehicle understructure and body construction, the combination with the superstructure and the chassis, of a transverse bolster supporting the superstructure, runners extending transversely of the bolster and supporting the latter, chassis beams carrying said runners, a floor in superposition to said bolster, bolts passing through the floor and the bolster, angular elements having portions disposed against the underside of the bolster and against the sides of the runners, with the bolts passing through said elements, eye-bolts depending on both sides of the runners and chassis beams, clamping plates passing beneath the chassis beams and having the eye-bolts passed therethrough and cross bolts passing through the eye-bolts, the angular elements and the runners.

2. In a vehicle understructure and body construction, the combination with the superstructure and the chassis, of a transverse superstructure supporting bolster, runners carrying the bolster, chassis beams carrying the runners, a floor in superposition to the bolster, bolts passing through the floor and bolster, angular elements having said bolts passing therethrough and clamped thereby against the underside of the bolster, eye-bolts facilitating the clamping of the runners to the chassis beams and cross bolts passing through the eye-bolts, the angular elements and the runners.

3. In a vehicle understructure and body construction, the combination with the superstructure and the chassis, of a bolster supporting said superstructure, runners carrying the bolster, chassis beams carrying the runners, a floor for the superstructure and in superposition to the bolster, strips extending longitudinally of the floor, bolts passing through the strips, the floor and the bolster, angular elements having the bolts passed therethrough to clamp the elements against the underside of the bolster, eye-bolts facilitating the clamping of the runners to the chassis beams and cross bolts passing through the eye-bolts, the angular elements and the runners.

4. In a vehicle understructure and body construction, the combination with the superstructure, of side sills having portions of the superstructure rabbeted thereto, a transverse bolster having the side sills traversing the same, longitudinally extending angle bars on the bolster and bolted to the side sills adjacent to the bolster, runners extending longitudinally beneath the body, with the bolster traversing the runners, means securing the runners to the chassis of the vehicle, an angle plate on one side of each runner, an angle bar on the other side of each runner and bolts, some of which pass through the bolster and the angle plates and others of which pass through the bolster and the angle bars.

5. In a vehicle understructure and body construction, the combination with supporting side sills and a transverse bolster, of means rigidly securing the side sills to the bolster, runners supporting said bolster, floor holding strips and securing means passing through the floor holding strips, the floor and the bolster, and secured to said runners.

6. In a vehicle understructure and body construction, the combination with a superstructure, side sills and a transverse bolster, with portions of the superstructure rabbeted to the side sills, of a floor interfitted between the side sills, runners extending transversely of the bolster and supporting the latter, means for securing the runners to the chassis of the vehicle, floor strips, and means passing through the floor strips, the floor, and the bolster and having rigid connection with the runners.

In testimony whereof I affix my signature.

HARRY G. MOORE.